United States Patent
Han et al.

(10) Patent No.: US 9,817,250 B2
(45) Date of Patent: Nov. 14, 2017

(54) OPTICAL MODULATOR INCLUDING NANOSTRUCTURE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Muhammad Zulfiker Alam, Pasadena, CA (US); Harry Atwater, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 15/131,431

(22) Filed: Apr. 18, 2016

(65) Prior Publication Data

US 2017/0023803 A1 Jan. 26, 2017

Related U.S. Application Data

(60) Provisional application No. 62/194,923, filed on Jul. 21, 2015.

(30) Foreign Application Priority Data

Oct. 16, 2015 (KR) .................. 10-2015-0144741

(51) Int. Cl.
*G02F 1/015* (2006.01)
*G02F 1/01* (2006.01)
(Continued)

(52) U.S. Cl.
CPC ............ *G02F 1/015* (2013.01); *G02F 1/0102* (2013.01); *G02F 1/0121* (2013.01); *B82Y 20/00* (2013.01); *G02B 5/008* (2013.01); *G02F 1/19* (2013.01); *G02F 2001/0151* (2013.01); *G02F 2203/10* (2013.01); *Y10S 977/932* (2013.01)

(58) Field of Classification Search
CPC ........ G02F 1/01; G02F 1/0102; G02F 1/0121; G02F 1/015; G02F 1/19;
(Continued)

(56) References Cited

U.S. PATENT DOCUMENTS 7,010,183 B2 * 3/2006 Estes ............... B82Y 20/00
                                                      359/333
7,315,426 B2 * 1/2008 Kim ................. B82Y 20/00
                                                      250/307

(Continued)

FOREIGN PATENT DOCUMENTS

| JP | 2006-504128 A | 2/2006 |
| JP | 2012-3265 A | 1/2012 |
| KR | 10-2013-0096523 A | 8/2013 |

OTHER PUBLICATIONS

Budnitskii et al., "Evaluation of Chromium Concentration in High-Resistive GaAs: Cr Produced by Diffusion", Russian Physics Journal, vol. 54, No. 2, Jul. 2011, 4 total pages.

*Primary Examiner* — Loha Ben
(74) *Attorney, Agent, or Firm* — Sughrue Mion, PLLC

(57) ABSTRACT

An optical modulator includes a plurality of nanostructures, each nanostructure of the plurality of nanostructures having a refractive index that is variable; a first insulation layer having a refractive index that is less than the individual refractive indexes of the plurality of nanostructures and surrounding the plurality of nanostructures; and a refractive index changer configured to change the refractive indexes of the plurality of nanostructures.

22 Claims, 17 Drawing Sheets

(51) Int. Cl.
*G02F 1/03* (2006.01)
*B82Y 20/00* (2011.01)
*G02F 1/19* (2006.01)
*G02B 5/00* (2006.01)

(58) Field of Classification Search
CPC ......... G02F 2001/0151; G02F 2203/10; G02F 1/23; B82Y 20/00; Y10S 977/932; G02B 5/008
USPC ....... 359/241, 244, 238, 257, 259, 279, 240, 359/245; 977/700, 902, 932, 949
See application file for complete search history.

(56) References Cited

U.S. PATENT DOCUMENTS

| | | | |
|---|---|---|---|
| 7,492,530 B2* | 2/2009 | Kim | B82Y 20/00 359/298 |
| 8,270,081 B2* | 9/2012 | Huff | G02B 1/005 359/584 |
| 8,368,898 B2* | 2/2013 | Yamada | B82Y 20/00 356/445 |
| 8,571,373 B2* | 10/2013 | Wang | G02B 6/1225 385/129 |
| 8,711,463 B2* | 4/2014 | Han | B82Y 20/00 359/238 |
| 9,256,113 B2* | 2/2016 | Han | G02F 1/19 |
| 9,285,611 B2* | 3/2016 | Han | B82Y 20/00 |
| 9,507,182 B2* | 11/2016 | Williams | G02F 1/035 |
| 9,547,185 B2* | 1/2017 | Chen | G02B 1/14 |
| 9,547,186 B2* | 1/2017 | Han | B82Y 20/00 |
| 9,632,216 B2* | 4/2017 | Han | G02B 5/008 |
| 2005/0270121 A1 | 12/2005 | Castiglione et al. | |
| 2011/0311234 A1 | 12/2011 | Almassy et al. | |
| 2013/0215483 A1 | 8/2013 | Han et al. | |
| 2014/0374872 A1 | 12/2014 | Rogers et al. | |
| 2016/0223723 A1 | 8/2016 | Han et al. | |

* cited by examiner

OPTICAL MODULATOR INCLUDING NANOSTRUCTURE

CROSS-REFERENCE TO RELATED APPLICATIONS

This application claims priority from U.S. Provisional Application No. 62/194,923, filed on Jul. 21, 2015, in the US Patent and Trademark Office and Korean Patent Application No. 10-2015-0144741, filed on Oct. 16, 2015, in the Korean Intellectual Property Office, the disclosures of which are incorporated herein in their entireties by reference.

BACKGROUND

1. Field

Apparatuses and methods consistent with the exemplary embodiments disclosed herein relate to an optical modulator including a nanostructure having high resolution as well as high photo efficiency and being capable of controlling characteristics of transmitted and received light.

2. Description of the Related Art

Optical devices for changing transmission or reflection, polarization, phase, intensity, path, and other characteristics of incident light are utilized in various optical apparatuses. In addition, optical modulators with various structures have been developed to control, via a desired method, the characteristics described above in an optical system.

As an example, a liquid crystal having optical anisotropy, a microelectromechanical system (MEMS) utilizing micromechanical movements of an optical blocking or reflecting device, and other types of devices have been widely used in optical modulators. Due to the characteristics of driving methods of these optical modulators, these optical modulators have a slow movement response time of an order greater than several micro-seconds ($\mu$s).

Recently, efforts have been made to utilize, in optical devices, a nanostructure which uses a surface plasmon resonance phenomenon occurring at a boundary between a metal layer and a dielectric layer.

SUMMARY

Exemplary embodiments provide an optical modulator including a nanostructure having high resolution as well as high photo efficiency and being capable of controlling characteristics of transmitted and received light.

Additional aspects will be set forth in part in the description which follows and, in part, will be apparent from the description, or may be learned by practice of the presented exemplary embodiments.

According to an aspect of an exemplary embodiment, an optical modulator includes a plurality of nanostructures, each nanostructure of the plurality of nanostructures having a refractive index that is variable; a first insulation layer having a refractive index that is less than the individual refractive indexes of the plurality of nanostructures and surrounding the plurality of nanostructures; and a refractive index changer configured to change the refractive indexes of the plurality of nanostructures.

The refractive index changer may include: a first electrode layer and a second electrode layer spaced apart from the first electrode layer, the plurality of nanostructures being provided between the first electrode layer and the second electrode layer; and a voltage source configured to apply voltage between the first electrode layer and the second electrode layer to change the refractive indexes of the plurality of nanostructures.

The second electrode layer may include a plurality of second sub-electrodes.

The first electrode layer may be a common electrode configured to apply a voltage to the second sub-electrodes.

At least one of the first electrode layer and the second electrode layer may be configured to transmit light.

The optical modulator may further include an electrical addressing structure configured to control the voltage applied to the second sub-electrodes.

The second electrode layer may further include a second insulation layer in which the second sub-electrodes are embedded.

A refractive index of the second insulation layer may be greater than the refractive index of the first insulation layer.

The nanostructures may include a non-centrosymmetric material.

The non-centrosymmetric material may include III-V group compounds.

The non-centrosymmetric material may include one of GaP, InP and GaAs.

The nanostructures may be doped with a metal impurity.

The metal impurity may include one of Fe, Cu, Cr and Mg.

The nanostructures may each respectively have a cross-section in a shape of a circle, an ellipse, a rectangle, or a square.

The nanostructures may be provided on the second sub-electrodes.

A distance between centers of two adjacent nanostructures, among the plurality of nanostructures, may be less than or equal to $\lambda$, where $\lambda$ is a resonance wavelength of the optical modulator.

The nanostructures may each respectively have a height that is $\lambda/4$ to $\lambda$, where $\lambda$ is a resonance wavelength of the optical modulator.

The optical modulator may further include a polarization plate provided on the plurality of nanostructures.

The optical modulator may further include a color filter provided on the plurality of nanostructures.

The nanostructures may be arranged in a shape or a pattern which changes depending on a location of the nanostructures within the optical modulator.

The first electrode layer and the second electrode layer may be configured to apply an identical voltage to the plurality of nanostructures.

The second sub-electrodes may include a doped silicon material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
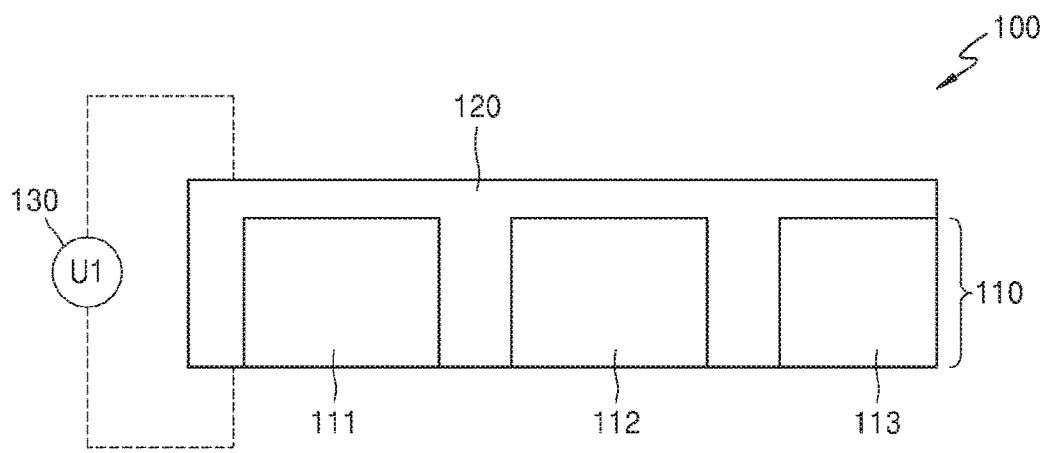
FIG. 1 is a cross-sectional view of an optical modulator according to an aspect of an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are described below, by referring to the figures, to explain aspects thereof. Expressions such as "at least one of," when preceding a list of elements, modify the entire list of elements and do not modify the individual elements of the list. An expression used in the singular may encompass the expression in the plural.

A detailed description of an optical modulator including a nanostructure will be presented below with reference to the drawings. A size of each component in the drawings may be exaggerated for the sake of convenience. In addition, the exemplary embodiments described below are illustrative only, and various modifications thereto may be possible.

In addition, with regard to a layer structure described below, terms such as "above" and "on" may indicate that an element is not only directly on and contacting another element, but may also indicate that the element is above or below another element without any contact therebetween, and additional intervening elements may be disposed between the element and the other element.

FIG. 1 is a cross-sectional view of an optical modulator 100 according to an aspect of an exemplary embodiment. Referring to FIG. 1, the optical modulator 100 may include a plurality of nanostructures 110, each of the plurality of nanostructures 110 having a variable refractive index, a first insulation layer 120 having a refractive index less than the refractive index of each of the plurality of nanostructures 110 and surrounding the plurality of nanostructures 110, and a refractive index change unit 130 (e.g., refractive index changer) configured to change the refractive index of each of the plurality of nanostructures 110.

Each of the plurality of nanostructures 110 may control characteristics of transmission or reflection of light and a phase of light input to the optical modulator 100 based on a resonance phenomenon occurring therein. Each of the plurality of nanostructures 110 may have a refractive index greater than a refractive index of a surrounding material in the first insulation layer 120, and thus, a boundary of each of the plurality of nanostructures 110 may have reflective characteristics. Accordingly, each of the plurality of nanostructures 110 may work as a resonance device. More specifically, according to an exemplary embodiment, each of the plurality of nanostructures 110 may work as a sub-wavelength resonance device having a dimension such as a height, radius, or width that is less than a wavelength of incident light. As a difference between the refractive index of each of the plurality of nanostructures 110 and a refractive index of surrounding materials, such as the first insulation layer 120, increases, each of the plurality of nanostructures 110 may capture light for a correspondingly longer period of time. A resonance wavelength $\lambda$ of each of the plurality of nanostructures 110 may be determined by a shape, a size, and the refractive index thereof. Each of the plurality of nanostructures 110 may have a thickness less than the resonance wavelength $\lambda$. Since infrared light or light in a visible range has a wavelength of hundreds of nanometers (nm), the thickness of each of the plurality of nanostructures 110 for transceiving visible light may be less than or equal to hundreds of nm.

Each of the plurality of nanostructures 110 may include a non-centrosymmetric material that provides a variable refractive index characteristic. The non-centrosymmetric material is a material with no inversion center and $LiNbO_3$ is a representative example. The non-centrosymmetric material may have piezoelectricity, pyroelectricity, ferroelectricity, or nonlinear optical properties due to the structural characteristics thereof. Each of the plurality of nanostructures 110 may include a structure including at least one of III-V group semiconductors, having non-centrosymmetric characteristics, such as GaP, InP and GaAs, and similar materials. The refractive index of the non-centrosymmetric semiconductor material may linearly vary in accordance with an electric field applied according to Equation 1 shown below (due to the Pockels effect)"

$$\Delta n = 2dn\epsilon_0 E \qquad \text{Equation 1}$$

In Equation 1 above, d is a coefficient for nonlinear refractive index change in accordance with a particular wavelength, n is a refractive index of the non-centrosymmetric semiconductor material, E is a magnitude of the electric field applied to the nanostructure 110, and $\epsilon_0$ is a permittivity of vacuum. For example, the refractive index change unit 130 may apply the electric field E to each of the plurality of nanostructures 110 having non-centrosymmetricity and cause a change in the refractive index thereof $\Delta n$. The change in the refractive index $\Delta n$ of each of the plurality of nanostructures 110 based on GaP may be calculated using the formula above to be about 1% when an electric field of $E=5\times10^5 V/cm$ is applied. If a resistance of each of the plurality of nanostructures 110 is not sufficiently large when such an electric field is applied, unnecessary electric waste due to a leakage current and a reduction of the change in the refractive index due to screening effects of the electric field may occur. Each of the plurality of nanostructures 110 may have high resistibility to prevent such phenomena. In addition, the change in the refractive index may anisotropically occur in accordance with a direction of the electric field due to voltage application and a direction of a crystal axis of the semiconductor material. In other words, anisotropy of the refractive index with respect to light may be controlled like in the case of a liquid crystal, which may be utilized as a control function of a polarization state as shown below. This feature is possible because different polarization components, such as phase plates, may be controlled to have different phase delay values, and such differences may be modulated according to the Pockels effect due to the voltage application.

As described above, each of the plurality of nanostructures 110 may include materials which simultaneously satisfy both the high refractive index and high resistivity requirements. Materials with a high refractive index may be, for example, materials with a refractive index greater than about 3. The refractive index of each of the plurality of nanostructures 110 may be selected to be greater than that of the first insulation layer 120 by a difference of 1.5 or more so that the refractive index difference may be sufficiently large between each of the nanostructures 110 and the first insulation layer 120. With respect to high resistivity, for example, each of the plurality of nanostructures 110 may have a resistance of equal to or greater than about $10^7$ Ω-cm when an electric field applied by the refractive index change unit 130 is about $10^5$ V/cm. Each of the plurality of nanostructures 110 may be doped with metal impurities to ensure a high resistivity of equal to or greater than about $10^7$ Ω-cm. For example, the metal impurities may include at least one of Cr, Fe, Co and Mg. The metal impurities may be selected depending on kinds of the semiconductors and non-metal materials in each of the plurality of nanostructures 110. Table 1 below illustrates exemplary types of crystals, dopants, and corresponding resistivity:

TABLE 1

| Crystal | Dopant | Resistivity (Ω-cm) |
| --- | --- | --- |
| GaAs | Chromium | $10^9$ |
| InP | Iron | $7.2 \times 10^7$ |
| GaP | Copper | $10^{14}$ |

According to an exemplary embodiment, when a nanostructure 110 includes GaAs and is doped with a Chromium (Cr) impurity, the nanostructure 110 may have a resistance of about $10^9$ Ω-cm and a resonance wavelength in an infrared light range. When the nanostructure 110 includes InP and is doped with Iron (Fe) as an impurity, the nanostructure 110 may have a resistance of about $7.2 \times 10^7$ Ω-cm and a resonance wavelength between the infrared light range and visible light range. When the nanostructure 110 includes GaP and is doped with Copper (Cu) as an impurity, the nanostructure 110 may have a resistance of about $10^{14}$ Ω-cm and a resonance wavelength between the infrared light range and visible light range. In the case of GaP, to obtain a change of about 1% in the refractive index, an electric field of about $5 \times 10^5$ V/cm is needed. Since this electric field is sufficiently less than a break-down electric field strength of the first insulation layer 120, an electric short may be prevented and the electric field may be maintained. In the case of doping the nanostructure 110 with the Cu impurity, since a resistance of $10^{14}$ Ω-cm may be obtained due to GaP, an unnecessary electric field screening effect, a current flow, and power leakage may be prevented.

As each of the pluralities of nanostructures 110 may include materials satisfying simultaneously the requirements for high refractive index and high resistivity, each of the pluralities of nanostructures 110 may simultaneously function as a resonator of light for a particular wavelength and an electro-optical tuner capable of controlling a working wavelength. In addition, the optical modulator 100 including the plurality of nanostructures 110 having simultaneously high refractive index and high resistivity may have a much simpler structure than a structure of a plasmonic resonator.

The first insulation layer 120 may include insulation materials such as air, oxides ($SiO_2$, $Al_2O_3$, $HfO_2$) and polymer (SU8, polydimethylsiloxane (PDMS), polymethyl methacrylate (PMMA), etc.). In addition, the first insulation layer 120 may include materials having a refractive index less than a refractive index of each of the plurality of nanostructures 110. The first insulation layer 120 may surround the plurality of nanostructures 110 to prevent an electric leakage due to each of the plurality of the nanostructures 110 being in direct contact with the refractive index change unit 130. However, when each of the plurality of nanostructures 110 has a high resistivity, the electric leakage due to each of the plurality of nanostructures 110 being in direct contact with the refractive index change unit 130 may be negligible, and in such a case, the performance of the optical modulator 100 may not be affected. In addition, as described above, when a difference between the refractive index of each of the plurality of nanostructures 110 and the first insulation layer 120 is large, optical efficiency in relation to a resonance wavelength may increase and each of the plurality of nanostructures 110 may function as a resonator.

The refractive index change unit 130 may control resonance characteristics by changing the refractive index of each of the plurality of nanostructures 110. Changing characteristics of reflection or transmission, including characteristics such as strength, phase and polarization with respect to incident light, may be possible according to exemplary embodiments. In addition, a resonance phenomenon may be generated in the case of light having a different wavelength by changing the resonance wavelength. Since the refractive index change unit 130 may individually change the refractive index of each of the plurality of nanostructures 110, the optical modulator 100 may include the plurality of nanostructures 110 having various resonance characteristics depending on usage purposes. A detailed structure of the refractive index change unit 130 will be described later.

Each of the plurality of nanostructures 110 may function as a nano-antenna. The resonant wavelength of the nano-antenna may vary linearly with the physical dimensions of the nano-antenna. The resonant wavelength range of the nano-antenna may be controlled by the refractive index change unit 130. Referring to FIG. 1, each of the nanostructures 111, 112, and 113 may function as a nano-antenna and may have a different resonant wavelength.

Figure 2A:
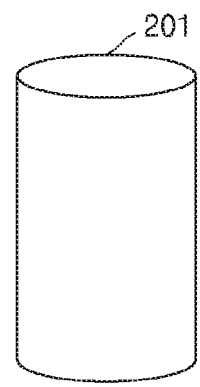
FIGS. 2A, 2B, 2C and 2D are perspective views of various shapes of a nanostructure according to an aspect of an exemplary embodiment.
Figure 2B:
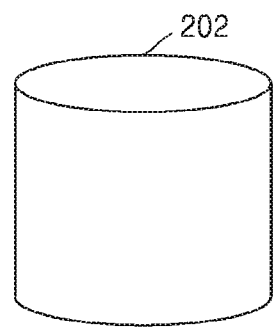
Figure 2C:
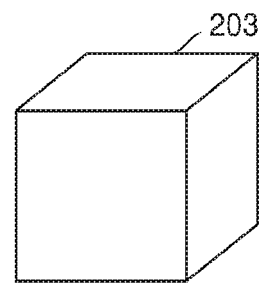
Figure 2D:
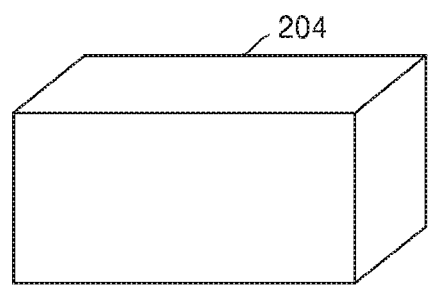

FIGS. 2A, 2B, 2C and 2D are perspective views of various shapes of each of the plurality of nanostructures 110, according to an aspect of an exemplary embodiment. A particular wavelength, polarization, an angle, or other characteristics of light to which each of the plurality of nanostructures 110 corresponds may be changed depending on the shape and a volume of each of the plurality of nanostructures 110. Each of the plurality of nanostructures 110 may have a pillar structure. The pillar structure may have a cross-section in a shape of a circle, an ellipse, a square, or a rectangle. FIG. 2A illustrates a pillar shape 201 having a circular cross-section. FIG. 2B illustrates a pillar shape 202 having an elliptic cross-section. FIG. 2C illustrates a pillar shape 203 having a square cross-section. FIG. 2D illustrates a pillar shape 204 having a rectangular cross-section. The pillar shape may be slanted in a height direction. Also, it is understood that the shapes shown in FIGS. 2A, 2B, 2C and 2D are exemplary only, and the nanostructures 110 may have many other shapes according to aspects of other exemplary embodiments. For example, the nanostructures 110 are not limited to pillar shapes, and may have various types of flat or curved shapes, including various combinations of different shapes.

Figure 3:
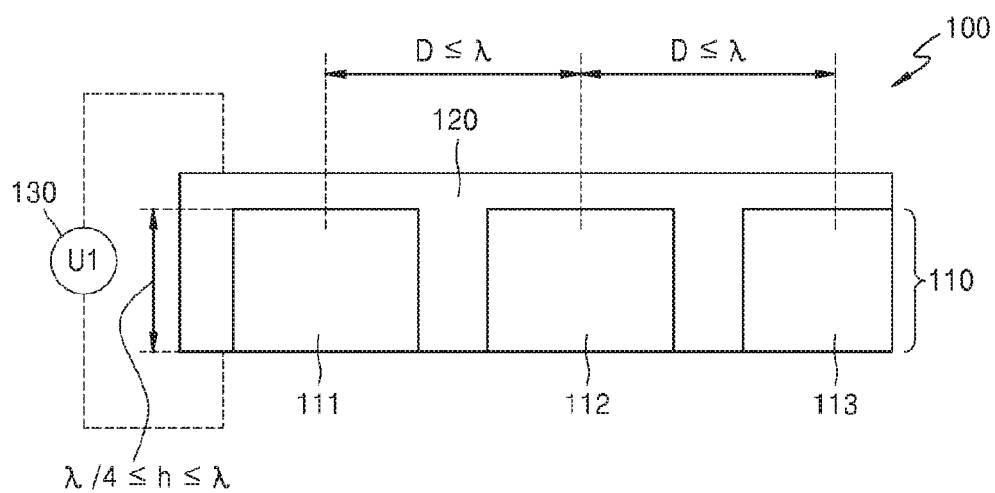
FIG. 3 is a cross-sectional view showing conditions for a height and an arrangement of a nanostructure of the optical modulator of FIG. 1, according to an aspect of an exemplary embodiment.

FIG. 3 is a cross-sectional view of conditions corresponding to a height h and an arrangement of a plurality of the nanostructures 110 of the optical modulator 100 according to FIG. 1. Referring to FIG. 3, a distance D between centers of adjacent nanostructures 110 may be less than or equal to a resonance wavelength $\lambda$ of the optical modulator 100. Such arrangement of the plurality of nanostructures 110 may not cause a higher-order diffraction in response to incident light and may be used to control characteristics of reflection, transmission, or absorption of the incident light according to a desired purpose. In addition, the height h of each of the plurality of nanostructures 110 may be, for example, about $\lambda/4$ to about $\lambda$.

Figure 4:
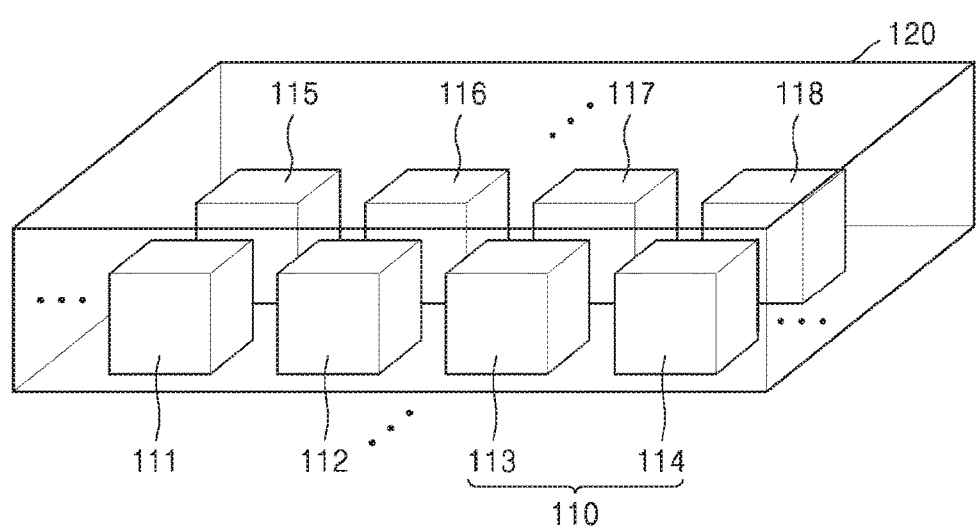
FIG. 4 is a perspective view of a two-dimensional arrangement of the nanostructure of FIG. 1 according to an aspect of an exemplary embodiment.

FIG. 4 is a perspective view of a two-dimensional arrangement of the each of the plurality of nanostructures 110 of FIG. 1. In FIG. 4, the plurality of nanostructures 110 include eight nanostructures 111, 112, 113, 114, 115, 116, 117 and 118. Referring to FIG. 4, the plurality of the nanostructures 110 may be two-dimensionally arranged in the first insulation layer 120. Referring to FIG. 4 again, as an example, each of nanostructures 111, 112, 113, 114, 115, 116, 117, and 118 may be spaced apart from each other by a certain gap. However, the exemplary embodiments are not limited thereto and various arrangements of the plurality of nanostructures 110 may be possible depending on the usage purposes of the optical modulator 100.

Figure 5:
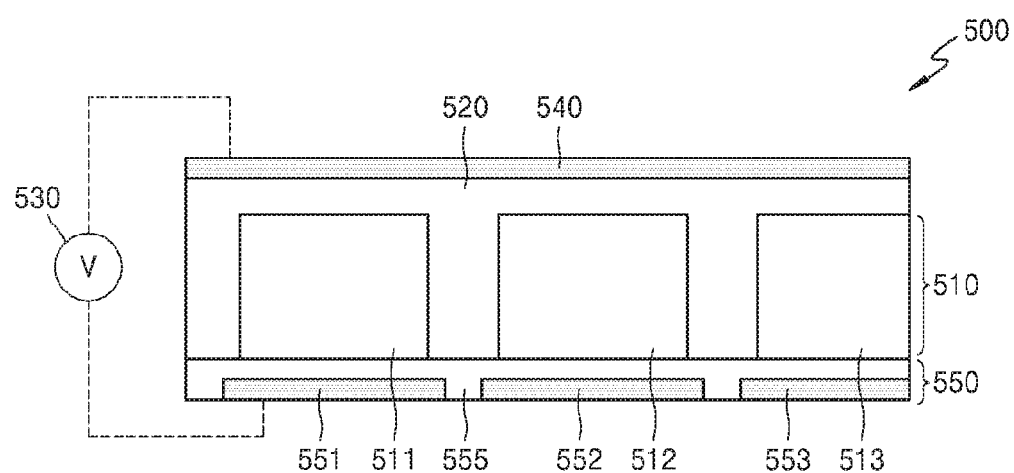
FIG. 5 is a cross-sectional view of an optical modulator according to an aspect of another exemplary embodiment.

FIG. 5 is a cross-sectional view of an optical modulator 500 according to an aspect of another exemplary embodiment. Referring to FIG. 5, a refractive index change unit may include a first electrode layer 540, a second electrode layer 550, and a voltage regulator 530. The first electrode layer 540 and the second electrode layer 550 may be spaced apart from each other with the first insulation layer 520 there between.

The first electrode layer 540 may be a common electrode configured to apply a voltage to each of the plurality of second sub-electrodes 551, 552, and 553 of the second electrode layer 550. The first electrode layer 540 may include transparent conductive materials. According to an exemplary embodiment, the transparent conductive materials may include oxides, for example, indium tin oxide (ITO) and ZnO-based transparent conductive materials such as indium zinc oxide (IZO), aluminum zinc oxide (AZO), and gallium zinc oxide (GZO). According to another exemplary embodiment, thin, doped silicon material with a thickness less than a wavelength of light may be used as the transparent conductive material. Light may enter the first electrode layer 540, and accordingly, the first electrode layer 540 may have a transmitting surface characteristic that neither reflects nor absorbs light.

The second electrode layer 550 may include one or a plurality of second sub-electrodes 551, 552, and 553. The second sub-electrodes 551, 552, and 553 may be embedded in the second insulation layer 555. The second sub-electrodes 551, 552, and 553 may include metals such as aluminum (Al), gold (Au), silver (Ag), copper (Cu), lead (Pb), indium (In), tin (Sn) and cadmium (Cd). In addition, transparent conductive oxides and doped Si as described above may be utilized. The second insulation layer 555 may have a structure surrounding the second sub-electrodes such that the second sub-electrodes 551, 552, and 553 are not in direct contact with the nanostructure 510. In this case, an un-doped or low-doped Si layer may be used as the second insulation layer 555 and a high-doped Si sub-electrode may be used as the second sub-electrodes 551, 552 and 553. Since the second sub-electrodes may include doped silicon, a forming process of the second electrode layer 550 may be simplified by using a semiconductor doping process. In addition, usage of various semiconductor devices may be easy. When a voltage is applied to each of the second sub-electrodes 551, 552, and 553 and the first electrode layer 540, an electric field may be formed between each of the second sub-electrodes 551, 552, and 553 and the first electrode layer 540. The electric field applied to a nanostructure 510 may change a refractive index thereof. As described above, a change in the refractive index may change resonance characteristics and the optical response of the corresponding nanostructure 510. Each of the nanostructures 551, 552, and 553 may be respectively arranged on the second sub-electrodes 551, 552, and 553. This arrangement is used to tune the refractive index of the nanostructure 510 in accordance with a change of the electric field formed in each of the second sub-electrodes 551, 552, and 553. Furthermore, this arrangement may be acceptable as long as a sensitivity of the refractive index of the nanostructure 510 due to a change in the electric field is maintained. Thus, even though the plurality of nanostructures 510 and the second sub-electrodes 551, 552, and 553 arranged in an array may be mis-aligned (even to a small extent), functioning of the optical modulator 500 may be maintained.

The second insulation layer 555 may include conventional insulator materials for a semiconductor fabrication process such as $SiO_2$, $SiN_x$, $HfO_2$, $Al_2O_3$, $La_2O_3$, $ZrO_2$, HfSiO, HfSiON, HfLaO and SrTiO, or other materials known to those skilled in the art. In addition, usage of polymer-based insulator materials such as SU8, PDMS and PMMA described above may be possible.

The voltage regulator 530 may apply a voltage to the first electrode layer 540 and the second electrode layer 550. The voltage, which is a control signal, is not limited to any particular type of voltage and may be an AC voltage or a DC voltage. The voltage regulator 530 may apply respectively different voltages to each of the plurality of the second sub-electrodes 551, 552, and 553, and accordingly, the resonance characteristics and the resonance wavelength $\lambda$ of each of the nanostructures may be respectively designed and controlled.

Figure 6:
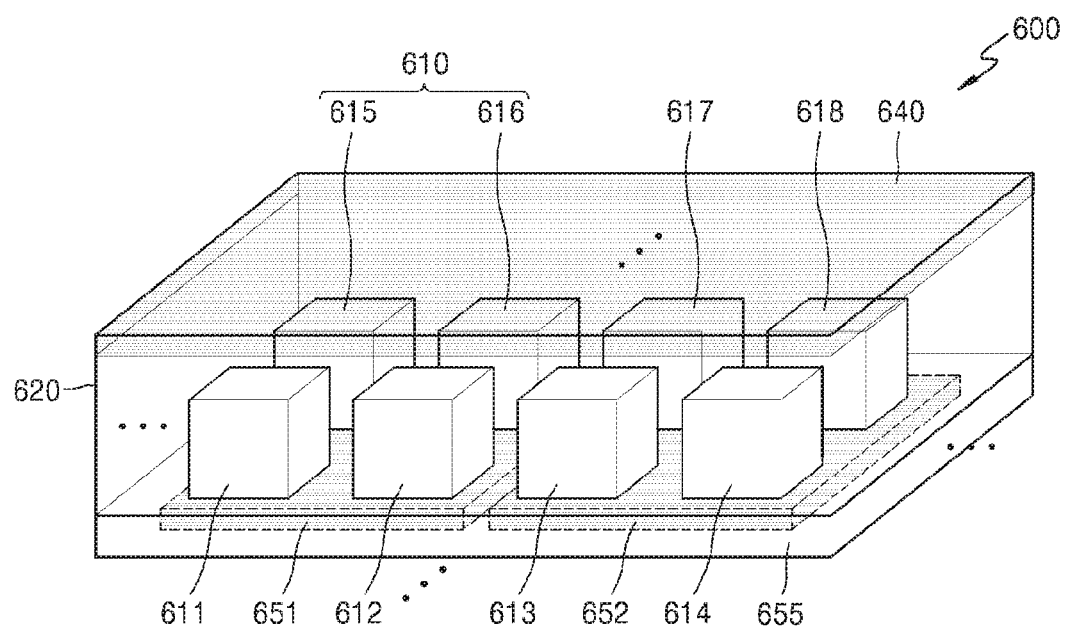
FIG. 6 is a perspective view of an optical modulator according to an aspect of another exemplary embodiment.

FIG. 6 is a perspective view of an optical modulator 600 according to an aspect of another exemplary embodiment. In FIG. 6, the plurality of nanostructures 610 include eight nanostructures 611, 612, 613, 614, 615, 616, 617, and 618. One of the second sub-electrodes 651 may correspond to a pattern formed by a plurality of nanostructures 610. The first electrode layer 640 and the second electrode layer 655 may be spaced apart from each other with the first insulation layer 620 therebetween. The optical modulator 600 may have a simple structure and operation. In certain situations, each of the nanostructures 610 may not need to be independently operated depending on a function of the optical modulator 600, and in such situations, the plurality of nanostructures 610 may be bundled in a pattern to correspond to one of the second sub-electrode 651, and thus, the pattern of the plurality of nanostructures 610 may function as a group. In addition, a structure of a refractive index change unit corresponding to the second sub-electrode 651 may be simplified.

Referring to FIG. 6, nanostructures 611, 612, 615, and 616 may be arranged in a 2×2 array pattern on a second sub-electrode 651 and nanostructures 613, 614, 617, and 618 may be arranged in a 2×2 array pattern on a second sub-electrode 652. According to an exemplary embodiment, this arrangement may be periodically repeated. When the optical modulator 600 operates as spatial optical modulator for controlling light with wavelengths or colors different from each other, the pattern of the plurality of nanostructures 610 arranged on each of second sub-electrodes 652 may have a shape and an arrangement with particular resonance wavelengths corresponding to red color R, green color G, and blue color B. According to an exemplary embodiment, the nanostructures 611, 612, 615, and 616 arranged on the second sub-electrode 651 may have a resonance wavelength corresponding to a red color (R), the nanostructures 613, 614, 617, and 618 arranged on the second sub-electrode 652 may have a resonance wavelength corresponding to a green color (G), and additional nanostructures arranged on the third sub-electrode 653, not illustrated, may have a resonance wavelength corresponding to a blue color (B). It is understood that exemplary embodiments are not limited thereto, and many other combinations are possible (e.g., more or less than four nanostructures may correspond to a particular color, etc.). The optical modulator 600 may be applied to various optical apparatuses such as a display and a camera. In this case, more than one color filter or polarization film layer may be additionally arranged either on or below the nanostructures.

Figure 7:
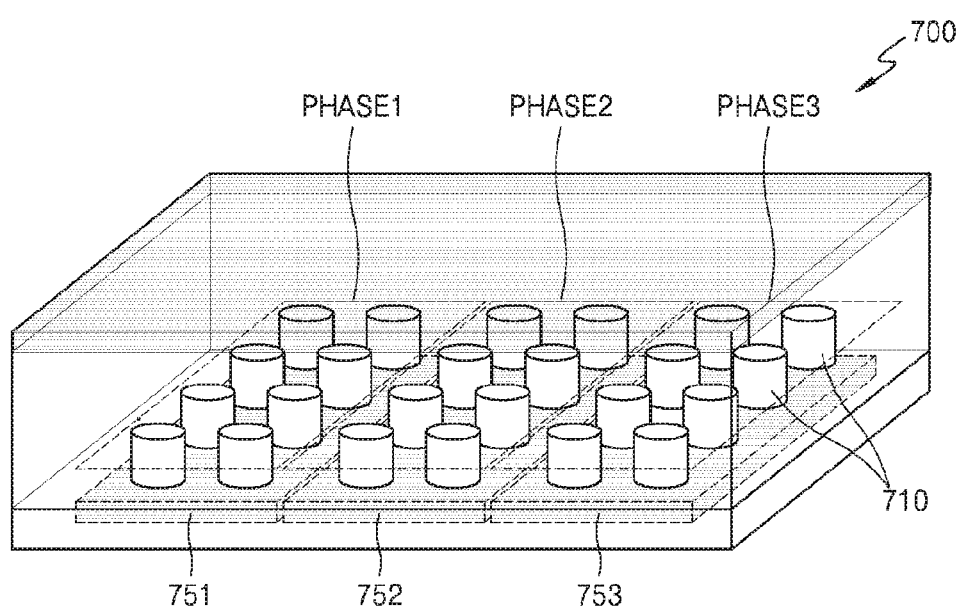
FIG. 7 is a perspective view of an optical modulator according to an aspect of another exemplary embodiment.

FIG. 7 is a perspective view of an optical modulator 700 according to an aspect of another exemplary embodiment. Second sub-electrodes 751, 752, and 753 may be arranged in a one-dimensional array. The one-dimensional array indicates that second sub-electrodes 751, 752, and 753 are arranged in parallel to each other in a direction perpendicular to any one side of the optical modulator 700 as a reference. In addition, a plurality of nanostructures 710 may be arranged in a two-dimensional array on each of the second sub-electrodes 751, 752, and 753. In FIG. 7, the two-dimensional array is illustrated a 2×4 array according to an exemplary embodiment. However, the exemplary embodiments are not limited thereto and the plurality of nanostructures 710 may be arranged in an m×n array, where m and n may be integers. In this case, the optical modulator 700 may be used as a device to control an intensity, a phase, a polarization state, or other characteristics of light in a one-dimensional direction. For example, when the phase and the intensity of reflected or transmitted light are controlled to be changed, periodically in the one-dimensional direction, the optical modulator 700 may be used as a Lidar device for changing a direction of a corresponding light.

Figure 8:
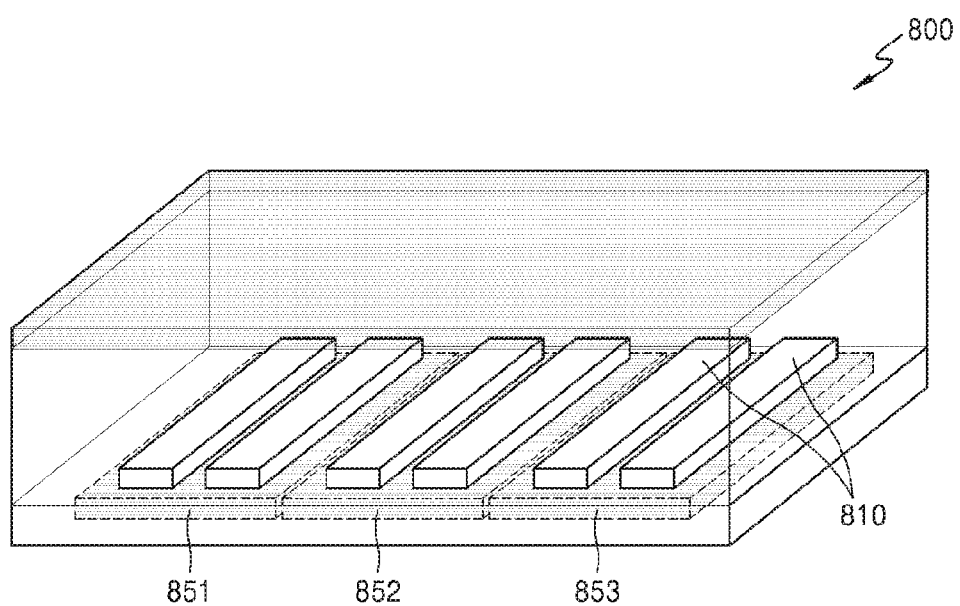
FIG. 8 is a perspective view of an optical modulator according to an aspect of another exemplary embodiment.

FIG. 8 is a perspective view of an optical modulator 800 according to an aspect of another exemplary embodiment. Referring to FIG. 8, second sub-electrodes 851, 852, and 853 may be arranged in a one-dimensional array. The one-dimensional array indicates that the second sub-electrodes 851, 852, and 853 are arranged in parallel to each other in a direction perpendicular to any one side of the optical modulator 800. Nanostructures 810 may be arranged on each of the second sub-electrodes 851, 852, and 853 in a one-dimensional array which corresponds to the arrangement of each of the second sub-electrodes 851, 852, and 853. The number and shape of the nanostructures 810 arranged on each of second sub-electrodes 851, 852, and 853 may be determined in accordance with a purpose of the optical modulator 800.

Figure 9:
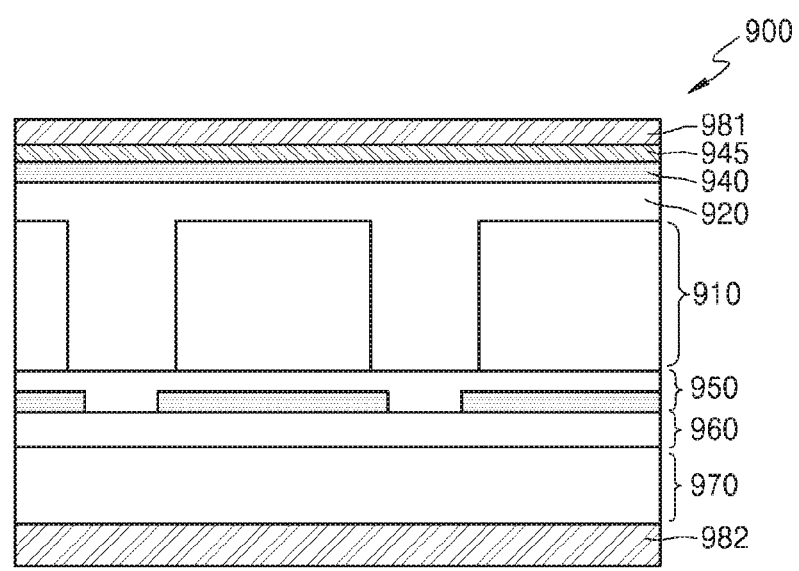
FIG. 9 is a cross-sectional view of an optical modulator according to an aspect of another exemplary embodiment.

FIG. 9 is a cross-sectional view of an optical modulator 900 according to an aspect of another exemplary embodiment. The optical modulator 900 may function as a transmission-type spatial optical modulator according to an exemplary embodiment. The optical modulator 900 may additionally include a first polarization plate 981 arranged on the structure of the optical modulator 500 of FIG. 5 according to an exemplary embodiment. The first polarization plate 981 may be arranged on at least one of an upper portion and a lower portion with respect to a nanostructure 910. In addition, the optical modulator 900 may include an electrical addressing structure 960 for controlling a voltage applied to each of second sub-electrodes of a second electrode layer 950 and a substrate 970 on the bottom portion of the optical modulator 500 of FIG. 5 according to an exemplary embodiment. The electrical addressing structure 960 may have transistors and electrical lines. A second polarization plate 982 may be arranged on the bottom portion of the substrate 970. The first polarization plate 981 and the second polarization plate 982 may be either identical or orthogonal with each other with regard to the response to input polarization states. However, the exemplary embodiments are not limited thereto. The axes of the first polarization plate 981 and the second polarization plate 982 may be arranged to be in parallel with each other or to form a predetermined angle. Since the optical modulator 900 may function as a transmission type optical modulator according to an exemplary embodiment, light from a light source (Is) may be incident on the second polarization plate 982 from the bottom portion of the optical modulator 900. In this case, since the electrical addressing structure 960 may be sufficiently thin and transparent and a thickness thereof may be sufficiently less than a wavelength of light, the incident light may not be distorted to any significant degree. The second electrode layer 950 and a first electrode layer 940 may have a transmission characteristic. The second electrode layer 950 and the first electrode layer 940 may include transmitting conductive materials, for example, ITO, ZnO-based transmitting conductive oxides such as IZO, AZO and GZO, doped Si, etc.

When the light from the light source is incident to the second polarization plate 982, only certain polarization states of the light may pass through the second polarization plate 982 and be incident on the nanostructure 910. Light passing through the nanostructure 910 may have a polarization state that changes depending on an electric field applied to a nanostructure by the first and second electrode layers 940, 950 and a relative direction between a crystallographic axes of the non-centrosymmetric material composing the nanostructure 910 and the polarization state of the incident light. According to an exemplary embodiment, the polarization state of the incident light may change with linear, circular, and elliptical polarizations. According to another exemplary embodiment, only a phase or an intensity of light passing through (reflected from or passing directly through) the nanostructure 910 in accordance with a voltage application may be changed, while a linear polarization state may be maintained without a change. When a linear polarizer is used as the first polarization plate 981 and a light that passed through the nanostructure 910 reaches the first polarization plate 981, the light may pass through the first polarization plate 981 if the light is linearly polarized parallel to a transmission polarization axis of the first polarization plate 981. When the light is not parallel to the transmission polarization axis of the first polarization plate 981, only a partial linear polarization component of the light parallel to a transmission polarization axis of the polarization plate 981 may pass through it. When the light that passed through the nanostructure 910 is in a linear polarization state and perpendicular to the transmission polarization axis of the first polarization plate 981, a polarized light may not pass through the first polarization plate 981. By using this principle and controlling a voltage applied to each of the second sub-electrodes 851, 852, and 853 through the electrical addressing structure 960, an intensity of light transmission, phase, polarization state and distribution of the incident light may be modulated in various ways. The optical modulator 900 may have a function of an optical component capable of modulating various elements as a spatial optical modulator. For example, the optical modulator 900 may operate as a shutter, a beam scanner, a variable focal lens, a polarization distribution control device, or other components. Also, characteristics of the intensity, the phase, and polarization output may be combined and controlled. The nanostructure 910 placed on each of the second sub-electrodes 851, 852, and 853 may be arranged to correspond to the resonance wavelength of each color such as R, G and B. In addition, color filters 945 for colors corresponding to the resonance wavelength of each of the sub-electrodes 851, 852, and 853 and the nanostructure 910 may be arranged on or below the nanostructure 910. In this case, the optical modulator 900 may be utilized as a display. Even when a second polarization plate 982 is not used, the optical modulator 900 of FIG. 9 may function as a transmission-type device. In this case, the optical modulator 900 may be used as a device for controlling the intensity of transmission or phase distribution of light, irrespective of a polarization state of incident light or a polarization state of each component of the incident light, based on a relationship between a crystallographic axis of a non-centrosymmmetric material of the nanostructure 910 and a direction of the electric field due to a voltage applied to the second electrode layer 950. The first electrode layer 940 and the second electrode layer 950 may be spaced apart from each other with the first insulation layer 920 therebetween.

Figure 10:
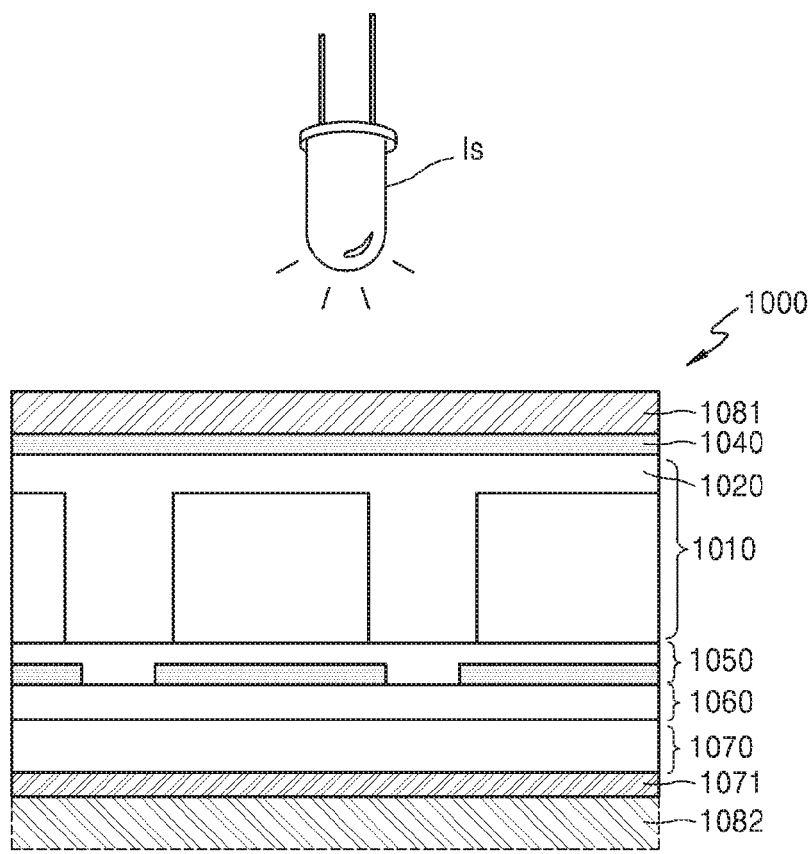
FIG. 10 is a cross-sectional view of an optical modulator according to an aspect of another exemplary embodiment.

FIG. 10 is a cross-sectional view of an optical modulator 1000 according to an aspect of another exemplary embodiment. The optical modulator 1000 may function as a reflection-type spatial optical modulator according to an exemplary embodiment. The working principle of the optical modulator 1000 is similar to a working principle of the optical modulator of FIG. 9. When a polarization plate is used, a light from a light source is incident in a direction toward a first polarization plate 1081. In this case a second polarization plate 1082 may not be needed. The light incident on the first polarization plate 1081 may be linearly polarized along a transmission polarization axis of the first polarization plate 1081 and be incident on a nanostructure 1010. The light may interact with the nanostructure 1010 and be reflected back after the polarization, and a phase and an intensity of the light may be modulated. In addition, the light may pass through the nanostructure 1010, be reflected on a reflection layer 1071 beneath a substrate 1070, pass again through the nanostructure 1010, and return to the first polarization plate 1081. The reflection layer 1071 may include a metal thin film and a multi-layer thin film. In this case, only components of the light in parallel with the transmission polarization axis of the first polarization plate 1081 may pass through the polarization plate 1081. The optical modulator 1000, like the spatial optical modulator 900 having a transmission-type function, may control the incident light via second sub-electrodes and an electrical addressing structure. Thus, the optical modulator 1000 may function as a reflection-type spatial optical modulator according to an exemplary embodiment. Even when a first polarization plate is not used, the optical modulator 1000, similarly to the optical modular of FIG. 9, which functions as transmission-type device, may operate to control a polarization, an intensity, and a phase output of the light. In addition, the optical modulator 1000 may be used as a display, and in this case, a color filter layer may be included therein.

A second electrode layer 1050 may include metals such as Al, Au, Ag, Cu, Pb, In, Sn and Cd. In addition, the transparent conductive oxides described above and doped Si may be utilized.

Figure 11A:
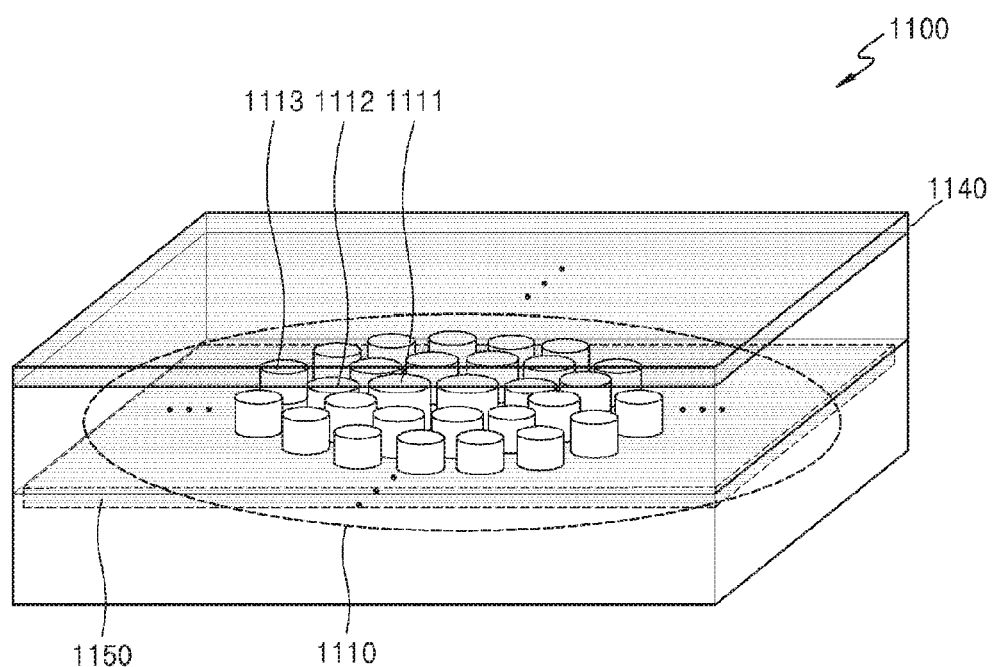
FIGS. 11A, 11B, 11C and 11D are cross-sectional views and perspective views of an optical modulator according to an aspect of another exemplary embodiment.
Figure 11B:
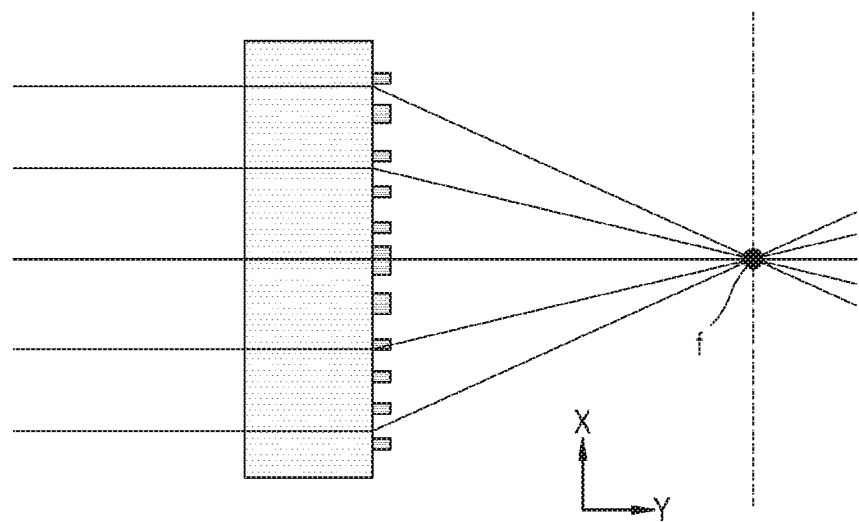

FIGS. 11A, 11B, 11C and 11D are cross-sectional views and perspective views of an optical modulator 1100 according to an aspect of another exemplary embodiment. Referring to FIG. 11A, in the optical modulator 1100 according to an exemplary embodiment, a shape or a cycle of a repeated arrangement (e.g., pattern) of a plurality of nanostructures 1110 varies with a location. Referring to FIG. 11A, each of the nanostructures 1111, 1112, and 1113 has a different size from each other. In addition, a first electrode layer 1140 and a second electrode layer 1150 may be arranged such that an identical voltage may be respectively applied to each of the plurality of nanostructures 1110. Referring to FIG. 11B, according to an arrangement of the plurality of nanostructures 1110, the plurality of nanostructures 1110 may function as a lens according to an exemplary embodiment. A related art lens has a focal distance which is determined according to a radius of curvature, and thus, the related art lens has a spherical shape. In the optical modulator 1100, the plurality of nanostructures 1110 may be arranged on a plane so that a plane-type optical modulator having characteristics of a lens which has a focal point f may be realized according to an exemplary embodiment. Accordingly, a volume of the optical modulator 1100 may be reduced in comparison with a volume of the related art lens. Functions of various lenses and prisms may be realized depending on the arrangement of the plurality of nanostructures 1110. The exemplary embodiments are not limited to any particular arrangement of the plurality of nanostructures 1110.

Figure 11C:
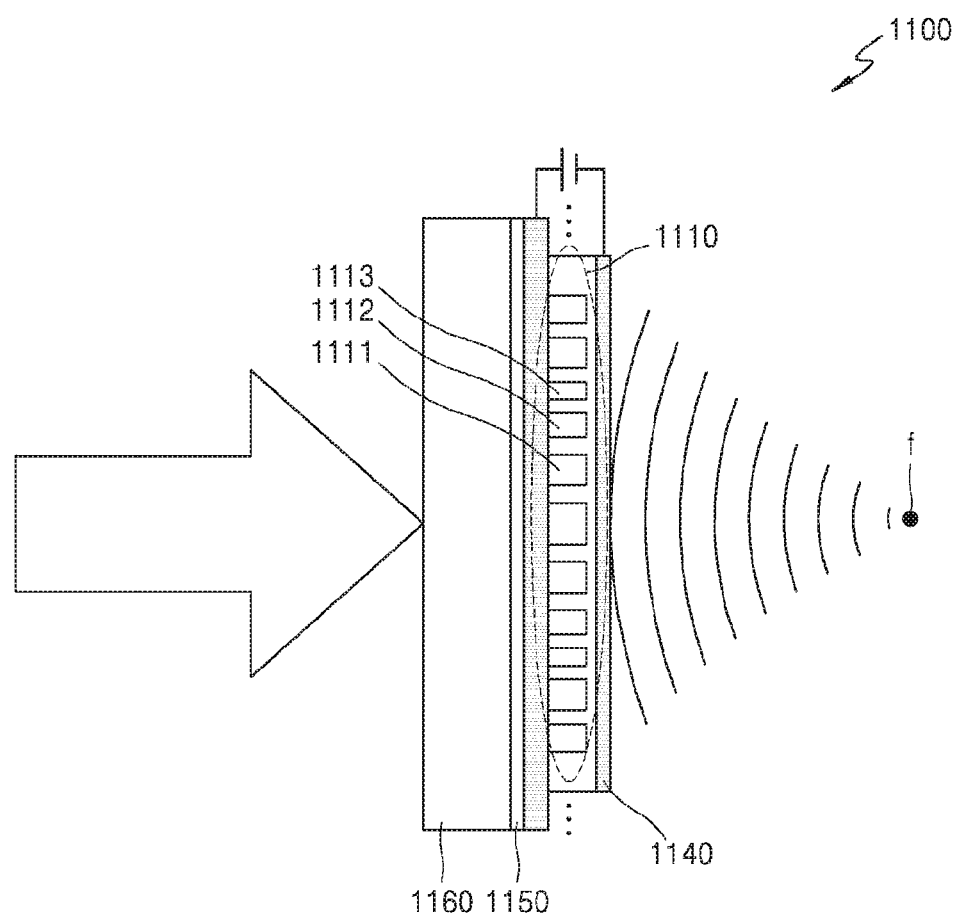

Referring to FIG. 11C, the optical modulator 1100 may function as a transmission-type convex lens. The shape or cycle of the repeating arrangement of the plurality of nanostructures 1110 may be determined such that a function of a convex lens having a particular focal distance may be provided. In addition, the second electrode layer 1150 may include a transmission-type material. In this case, when the incident light illustrated by an arrow is incident along a direction of the second electrode layer 1150 of the optical modulator 1100, the incident light may pass through the plurality of nanostructures 1110, and a phase delay of the incident light is controlled at each location of each of the plurality of nanostructures 1110 so that wavefronts at output terminals may be gathered and the incident light is focused toward a focal point f. A focal distance may be determined according to a shape and an arrangement of the plurality of nanostructures 1110. When a voltage is applied to the first electrode layer 1140 and the second electrode layer 1150, the wavefront (the phase delay per location) of the incident light at the output terminals of each of the plurality of nanostructures 1110 may be changed, and thus, the focal distance may be changed. Accordingly, the optical modulator 1110 according to FIG. 11C may function as a convex lens capable of changing the focal distance. In addition, the intensity of the light transmitted through the optical modulator 1100 may be controlled. The intensity of output light may be controlled either by controlling a polarization state thereof through a voltage application by using polarization plates in a similar way to the technique described with reference to FIG. 9 or by using a change in a degree of transmission of the incident light in accordance with the voltage application to each of the plurality of nanostructures 1110.

Figure 11D:
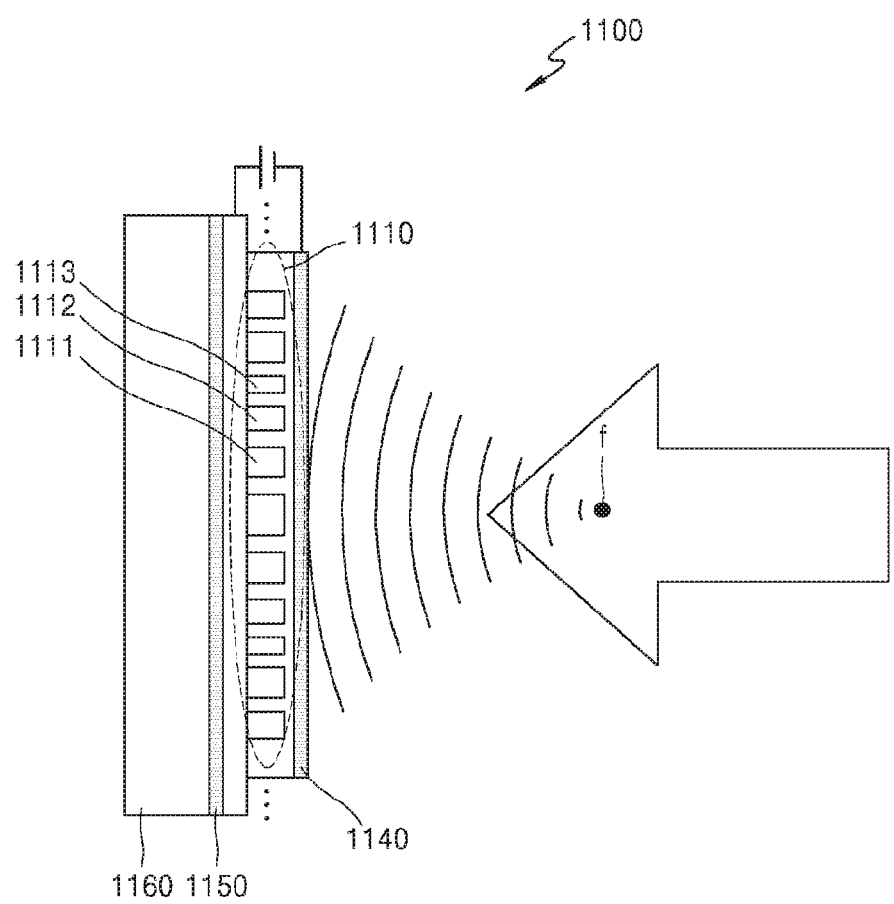

Referring to FIG. 11D, the optical modulator 1100 may function as a reflection-type lens. The shape or cycle of a repeating arrangement of the plurality of nanostructures 1110 may be determined such that the plurality of nanostructures 1110 functions as a concave mirror having a particular focal distance. The optical modulator 1100 may include the second electrode layer 1150 including a reflection-type material and may further include a reflection layer, not illustrated, below a substrate 1160. When the incident light illustrated by an arrow is incident in a direction of the first electrode layer 1140 of the optical modulator 1100, the incident light may be reflected at each of the plurality of nanostructures 1110 or at an additional reflection layer below the plurality of nanostructures 1110. In this case, the incident light may be concentrated at the focal point f due to a shape of a generated wavefront (phase delay per location). The focal distance may be changed by applying the electric field to the first electrode layer 1140 and the second electrode layer 1150 from a voltage application source. A construction of the voltage application source may be the same as described above and a detailed description will be omitted. Thus, the optical modulator 1100 according to FIG. 11D may function as a concave mirror capable of changing the focal distance. In addition, the intensity of reflected light may be controlled. The intensity of output light may be controlled by controlling a polarization state through voltage application using polarization plates in a similar technique to the technique described with reference to FIG. 10.

The optical modulators according to the exemplary embodiments may be used as a shutter to open and close a flow of light with a particular wavelength. For example, the optical modulators according to the exemplary embodiments may be used as a shutter to open and close, at a high speed, a flow of pulse-type light with an infrared wavelength or a visible light. As an example, the optical modulator according to an exemplary embodiment may be used as a shutter for modulating light signals to extract depth information by a three-dimensional camera based on a time-of-flight method. The optical modulator according to an exemplary embodiment may be used to realize a solid state shutter driven by a low power and operating at a high speed (for example, a level of 100 MHz). Structures of a related art camera and a three-dimensional camera may be well known and a detailed description will be omitted.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An optical modulator comprising:
 a plurality of nanostructures, each nanostructure of the plurality of nanostructures having a refractive index that is variable;
 a first insulation layer having a refractive index that is less than the individual refractive indexes of the plurality of nanostructures and surrounding the plurality of nanostructures; and
 a refractive index changer configured to change the refractive indexes of the plurality of nanostructures.

2. The optical modulator of claim 1, wherein the refractive index changer comprises:
 a first electrode layer and a second electrode layer spaced apart from the first electrode layer, the plurality of nanostructures being provided between the first electrode layer and the second electrode layer; and
 a voltage source configured to apply voltage between the first electrode layer and the second electrode layer to change the refractive indexes of the plurality of nanostructures.

3. The optical modulator of claim 2, wherein the second electrode layer comprises a plurality of second sub-electrodes.

4. The optical modulator of claim 3, wherein the first electrode layer is a common electrode configured to apply a voltage to the second sub-electrodes.

5. The optical modulator of claim 3, further comprising an electrical addressing structure configured to control the voltage applied to the second sub-electrodes.

6. The optical modulator of claim 3, wherein the second electrode layer further comprises a second insulation layer in which the second sub-electrodes are embedded.

7. The optical modulator of claim 6, wherein a refractive index of the second insulation layer is greater than the refractive index of the first insulation layer.

8. The optical modulator of claim 3, wherein the nanostructures are provided on the second sub-electrodes.

9. The optical modulator of claim 3, wherein the second sub-electrodes include a doped silicon material.

10. The optical modulator of claim 2, wherein at least one of the first electrode layer and the second electrode layer is configured to transmit light.

11. The optical modulator of claim 1, wherein the nanostructures comprise a non-centrosymmetric material.

12. The optical modulator of claim 11, wherein the non-centrosymmetric material comprises III-V group compounds.

13. The optical modulator of claim 12, wherein the non-centrosymmetric material comprises one of GaP, InP and GaAs.

14. The optical modulator of claim 1, wherein the nanostructures are doped with a metal impurity.

15. The optical modulator of claim 14, wherein the metal impurity comprises one of Fe, Cu, Cr and Mg.

16. The optical modulator of claim 1, wherein the nanostructures each respectively have a cross-section in a shape of a circle, an ellipse, a rectangle, or a square.

17. The optical modulator of claim 1, wherein a distance between centers of two adjacent nanostructures, among the plurality of nanostructures, is less than or equal to $\lambda$, where $\lambda$ is a resonance wavelength of the optical modulator.

18. The optical modulator of claim 1, wherein the nanostructures each respectively have a height that is $\lambda/4$ to $\lambda$, where $\lambda$ is a resonance wavelength of the optical modulator.

19. The optical modulator of claim 1, further comprising a polarization plate provided on the plurality of nanostructures.

20. The optical modulator of claim 1, further comprising a color filter provided on the plurality of nanostructures.

21. The optical modulator of claim 2, wherein the nanostructures are arranged in a shape or a pattern which changes depending on a location of the nanostructures within the optical modulator.

22. The optical modulator of claim 21, wherein the first electrode layer and the second electrode layer are configured to apply an identical voltage to the plurality of nanostructures.

* * * * *